United States Patent

Mulcahy et al.

[19]

[11] Patent Number: 6,000,859
[45] Date of Patent: Dec. 14, 1999

[54] CAMERA AND FLASH UNIT POSITIONING DEVICE

[76] Inventors: Timothy G. Mulcahy, 32 St. Elmo Rd.; Phillip H. Pritchard, Sr., 48 Reed St., both of Worcester, Mass. 06102

[21] Appl. No.: 09/134,237

[22] Filed: Aug. 14, 1998

Related U.S. Application Data

[63] Continuation-in-part of application No. 08/976,729, Nov. 24, 1997, abandoned, which is a continuation of application No. 08/766,753, Dec. 13, 1996, abandoned.

[51] Int. Cl.[6] .................................................. G03B 17/00
[52] U.S. Cl. ............................................................. 396/422
[58] Field of Search .................................... 396/155, 182, 396/189, 419, 420, 421, 422, 423, 424, 428; 362/11, 12; 348/370, 371

[56] References Cited

U.S. PATENT DOCUMENTS 3,550,519  12/1970  Lewis ....................................... 396/422
4,752,794   6/1988  Bohannon ............................... 396/189

*Primary Examiner*—Howard B. Blankenship
*Attorney, Agent, or Firm*—Steven N. Fox, Esq.

[57] ABSTRACT

The present invention is a device for use by a person to orientate a camera in either a horizontal or vertical position while allowing the person to position the light source of a flash unit above the lens of the camera. In one embodiment, the device comprises a base member having a camera support portion adapted to secure the camera. The device further comprises a first handle member engaged with the base member and adapted to allow the person to orientate the camera in either a horizontal position or a vertical position. The device further comprises a first flash unit support member comprising a first mounting portion adapted to removably secure the flash unit. The device further comprises a second flash unit support member comprising a second mounting portion adapted to removably secure the flash unit. either location without interference. Irrespective of whether the person chooses to orientate the camera in either the horizontal position or the vertical position, the person can selectively position the flash unit on either the mounting portion of the first flash unit support member or the mounting portion of the second flash unit support member so that the light source of the flash unit is disposed above the lens of the camera. Further, irrespective of whether the person orientates the camera in either the horizontal position or the vertical position, the handle member is always positioned adjacent to or below the lens of the camera as not to interfere with the operation of the flash unit.

17 Claims, 16 Drawing Sheets

CAMERA AND FLASH UNIT POSITIONING DEVICE

This Application is a continuation-in-part of application Ser. No. 08/976,729 filed on Nov. 24, 1997, which is a continuation of application Ser. No. 08/766,753 filed on Dec. 13, 1996, now both abandoned.

FIELD OF THE INVENTION

The present invention relates generally to photographic equipment. More particularly, the present invention relates to a device for supporting and positioning a camera and a flash unit.

BACKGROUND OF THE INVENTION

Professional photographic equipment generally consists of a camera and a flash unit. To enhance the quality of an image as well as to provide a means by which a photographer can hold and operate a camera and a flash unit simultaneously with ease, speed, and proficiency, a photographer will typically mount the camera and flash unit to what is is known in the photography industry as a flash unit bracket. There would be no need for a flash unit bracket if it were not for the need of a flash unit to operate simultaneously with the camera. The flash unit bracket is the means in which a photographer can had hold and operate a given camera and flash simultaneously in a portable fashion. A flash unit attached to a flash unit bracket synched with the camera provides the obvious light whether it be as the only source or as a fill source.

A given camera can take either horizontal or vertical images by rotating the camera in the desired position. A camera that is securely fixed to a flash unit bracket can obtain the same results (i.e, horizontal or vertical images) by simply rotating the bracket. Depending on the type of camera used will determine which way the photographer will rotate the bracket. For example, most cameras while held in a horizontal position will yield a negative or image that would result in a horizontal photograph. Likewise, when a bracket is held in a vertical position a camera will yield a negative or image that would result in a vertical photograph. There are camera however, that produce the opposite. A photographer would have to be aware of such cameras that take vertical images while held in a horizontal position and that take horizontal images while held in a vertical position.

A variety of conventional brackets have been developed in an effort to provide a working means for a camera an a flash unit. One such device is disclosed in U.S. Pat. No. 4,752,794 which generally comprises a base portion adapted to support the camera and a support bracket attached to the base portion. The device further comprises an elongated arm hingedly connected to the support bracket and adapted to support a flash unit so that a person can take either a horizontal or vertical photograph. However, such devices have numerous drawbacks. By way of example, such conventional brackets are awkward, cumbersome, not sturdy, and the arm carrying the flash unit can move out of position during use thereby causing inconvenience and loss of time. Moreover, such devices require both the handle member and the flash unit to be disposed above the lens of the camera when the photographer orientates the camera to take a vertical photograph. The position of the handle member above the lens of the camera and moreover between the lens of the camera and the flash unit makes it difficult for the photographer to work with ease, speed and proficiency.

SUMMARY OF THE PRESENT INVENTION

The present invention is a device for use by a person to orientate a camera in either a horizontal or vertical position while allowing the person to always position the light source of a flash unit above the lens of the camera. In one embodiment, the device comprises a base member having a camera support portion adapted to secure the camera. The device further comprises a first handle member engaged with the base member and adapted to allow the person to orientate the camera in either a horizontal position or a vertical position. The device further comprises a first flash unit support member comprising a first mounting portion adapted to removably secure the flash unit. The device further comprises a second flash unit support member comprising a second mounting portion adapted to removably secure the flash unit. Irrespective of whether the person chooses to orientate the camera in either the horizontal position or the vertical position, the person can selectively position the flash unit on either the first mounting portion of the first flash unit support member or the second mounting portion of the second flash unit support member so that the light source of the flash unit is disposed above the lens of the camera. Further, irrespective of whether the person orientates the camera in either the horizontal position or the vertical position, the handle member is always positioned adjacent to or below the lens of the camera so as not to interfere with the operation of the flash unit. The device of the present invention allows the professional photographer to use the light source to its fullest potential in terms of its light coverage thereby creating more favorable lighting results and a more flattering light upon the pattern, form or shape of the subject matter illuminated while reducing and/or eliminating a phenomenon commonly known as called red-eye, hard shadows.

BRIEF DESCRIPTION OF THE DRAWINGS

The following detailed description of the present invention will be more fully understood with reference to the accompanying drawings in which.

DETAILED DESCRIPTION OF THE PREFERRED EMBODIMENTS

Figure 1:
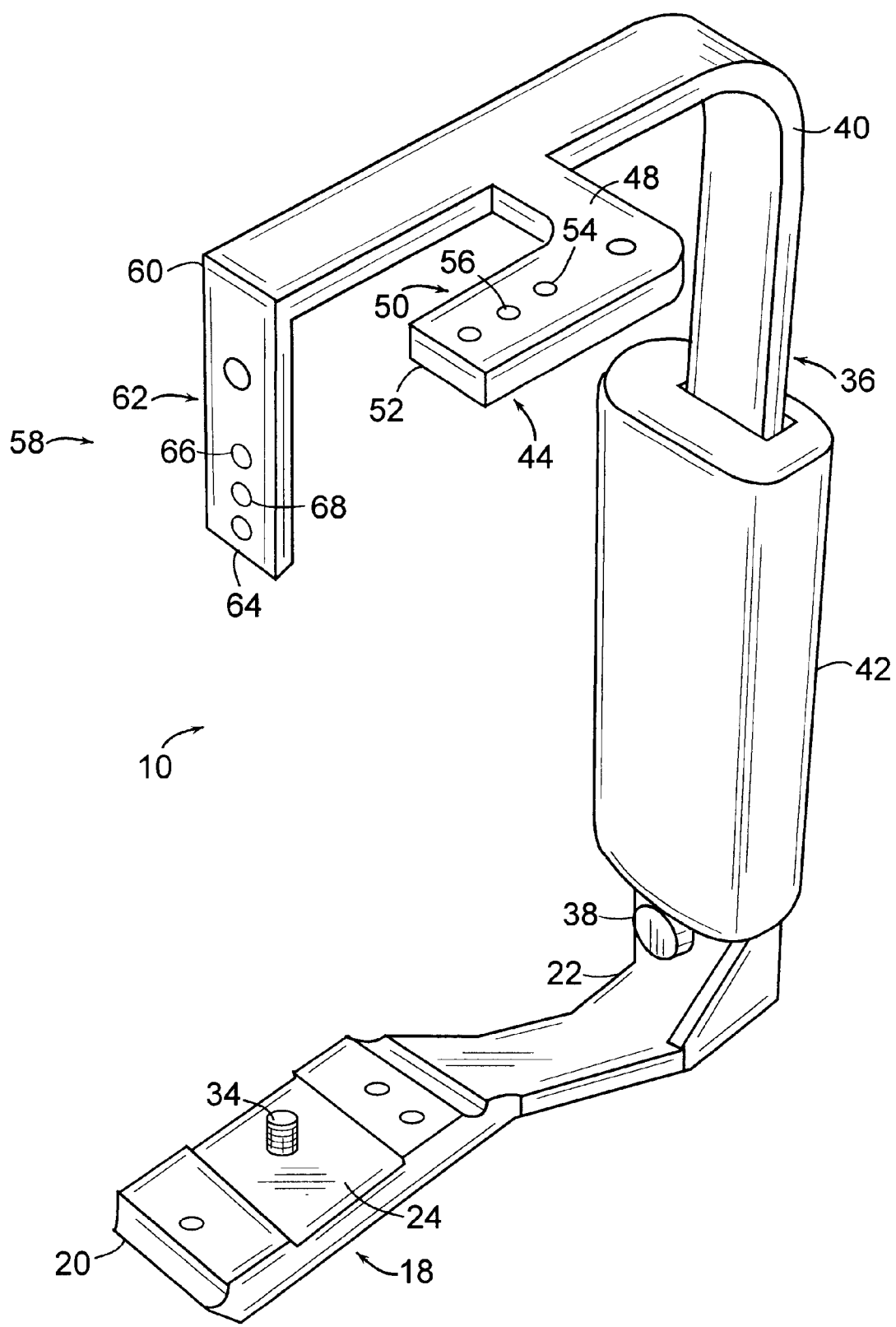
FIGS. 1–3 are perspective views of a first embodiment of the present invention.
Figure 2:
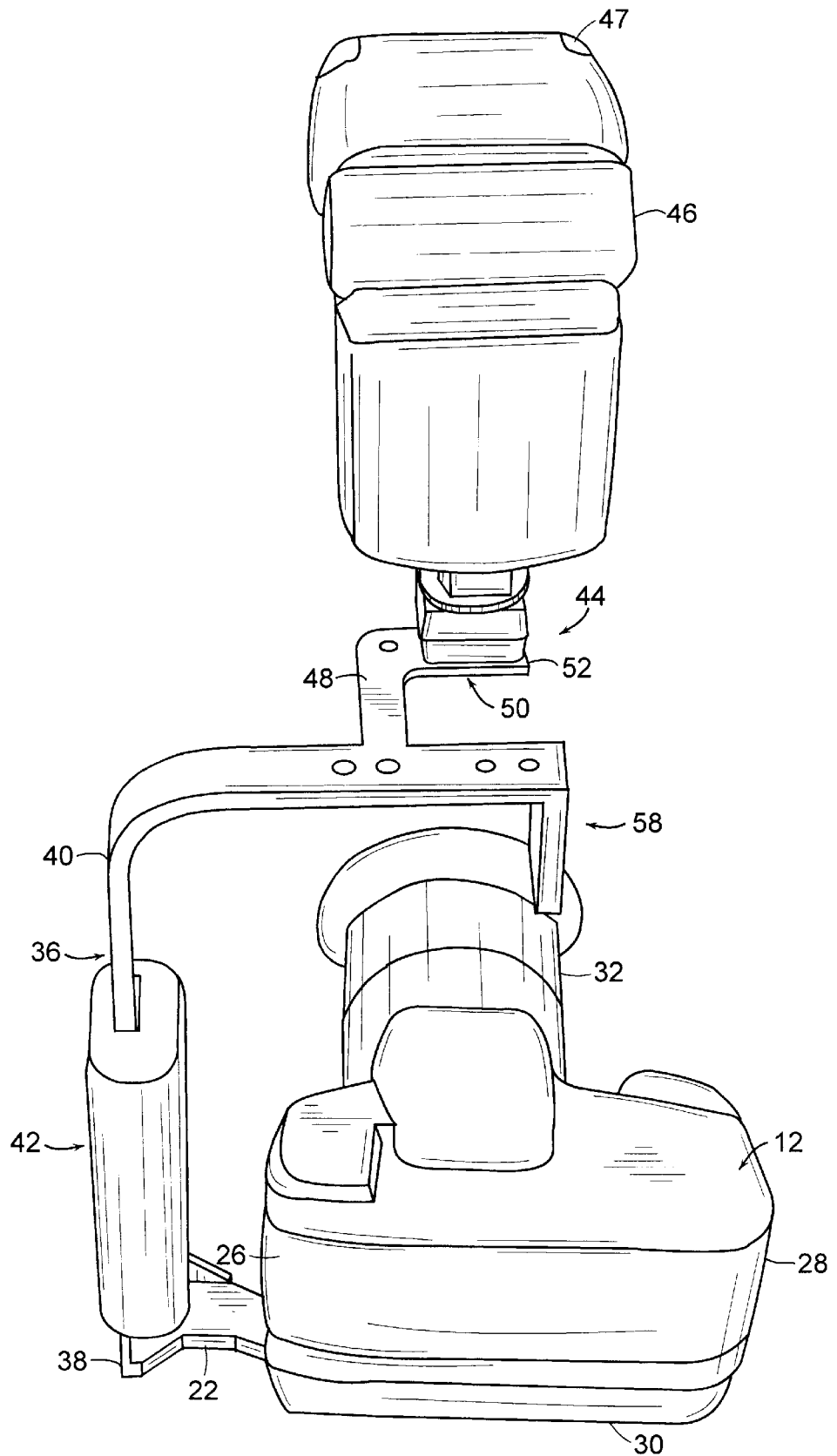
Figure 3:
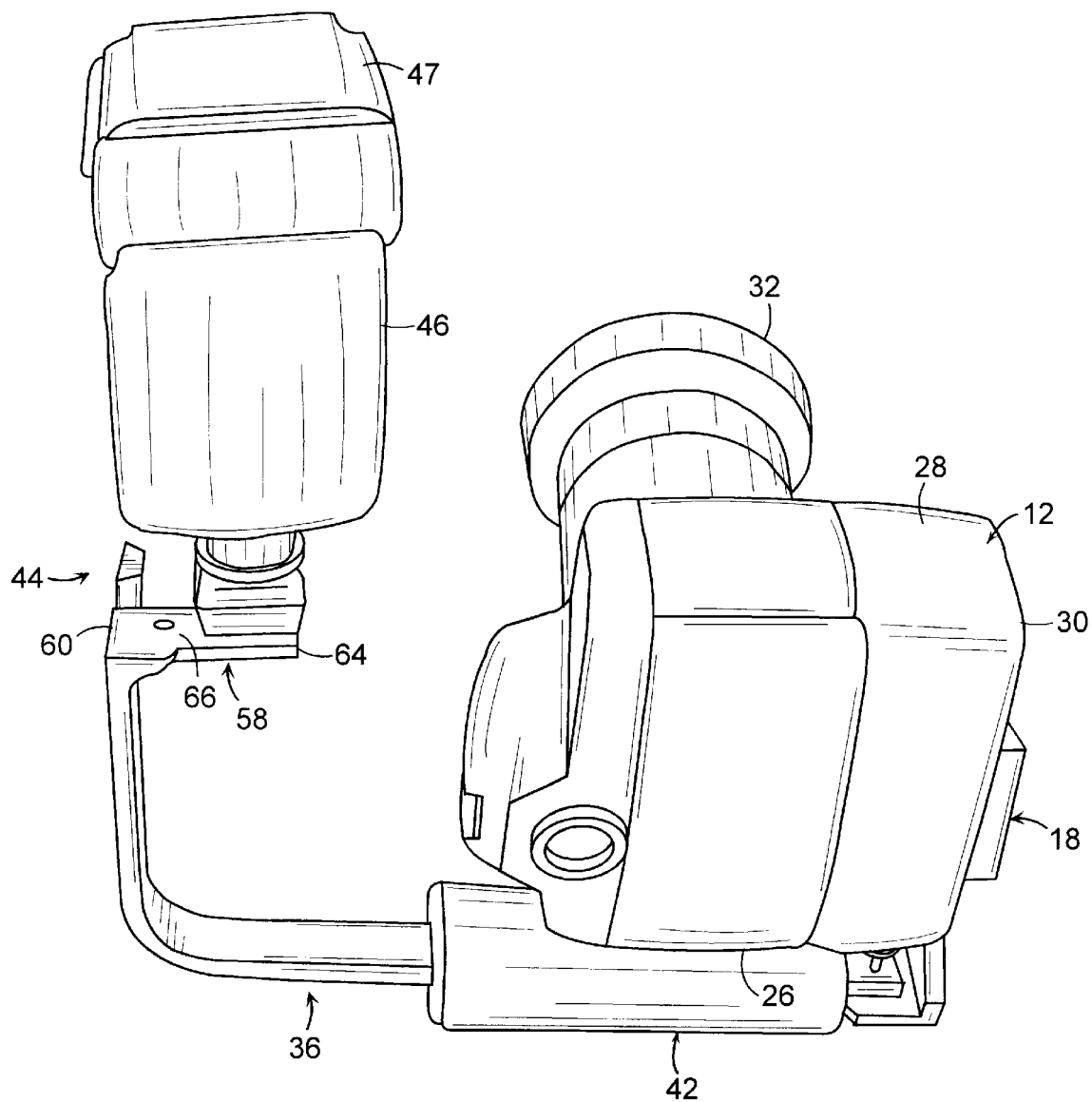

Referring to FIGS. 1–3, wherein a first embodiment of the camera and flash unit positioning device 10 is shown. The device 10 comprises a base member 18 having a first end portion 20, a second end portion 22 and a camera mounting portion 24. The camera mounting portion 24 is adapted to allow a person to removably secure a camera 12 to the base member 18. The camera 12 may take a variety of forms and designs and is generally defined by first and second sides 26 and 28, a bottom side 30 and a lens 32. The camera mounting portion 24 may take a variety of conventional designs and utilize a variety of conventional fastening mechanisms. In the embodiment shown, the camera mounting portion 24 uses a screw 34 which connects into the bottom side 30 of the camera 12. The device 10 further comprises a vertical support member 36 having a first end portion 38 and a second end portion 40. The device 10 further comprises a handle member 42 engaged with the vertical support member 36. The handle member 42 is provided so a person may orientate the camera 12 in either a horizontal position (FIG. 2) or a vertical position (FIG. 3).

The device 10 further comprises a first flash unit support portion 44 engaged with the base member 18 through the vertical support member 36. The first flash unit support member 44 is adapted to removably engage with and secure a variety of flash units 46 having a light source 47. The first flash unit support member 44 generally comprises a first end portion 48, a mounting portion 50, and a second free end portion 52. The mounting portion 50 is provided to removably and securely engage the flash unit 46. In the embodiment shown, the mounting portion 50 comprises a substantially planar mounting surface 54 and a plurality of openings 56 for engaging the flash unit 46 by conventional means. The mounting portion 50 may take a variety of different shapes and forms to thereby engage with different types of flash units 46. By way of example only, such fastening means may comprise a quick-release adaptor 55 (FIG. 5) which the person may slide over the second free end portion 52 and mounting surface 54 and snap into engagement with the openings 56.

The device 10 further comprises a second flash unit support portion 58 engaged with the base member 18 through the vertical support member 36. The second flash unit support member 58 is adapted to removably engage with and secure a variety of flash units 46 having a light source 47. The second flash unit support member 58 generally comprises a first end portion 60, a mounting portion 62, and a second free end portion 64. The mounting portion 62 is provided to removably and securely engage the flash unit 46. In the embodiment shown, the mounting portion 62 comprises a substantially planar mounting surface 66 and a plurality of openings 68 for engaging the flash unit 46 by conventional means. The mounting portion 62 may take a variety of different shapes and forms to thereby engage with different types of flash units 46. By way of example only, such fastening means may comprise a quick-release adaptor 55 (FIG. 5) which the person may slide over the second free end portion 64 and mounting surface 66 and snap into engagement with the openings 68. The mounting surface 66 of the second flash unit support member 58 and the mounting surface 54 of said first flash unit support member 44 are spaced a sufficient distance apart from each other to allow the flash unit 46 to be easily mounted to either location without interference. In the embodiment shown, the mounting surface 66 of the second flash unit support member 58 is substantially perpendicular to the mounting surface 54 of said first flash unit support member 44. The mounting portion 50 is off-set from the mounting portion 62.

Irrespective of whether the person chooses to orientate the camera 12 in either the horizontal position (FIG. 2) or the vertical position (FIG. 3), the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position (FIG. 2) or the vertical position (FIG. 3), the handle member 42 is always positioned adjacent to or below the lens 32 of the camera 12 so as not to interfere with the operation of the flash unit 46.

Figure 4:
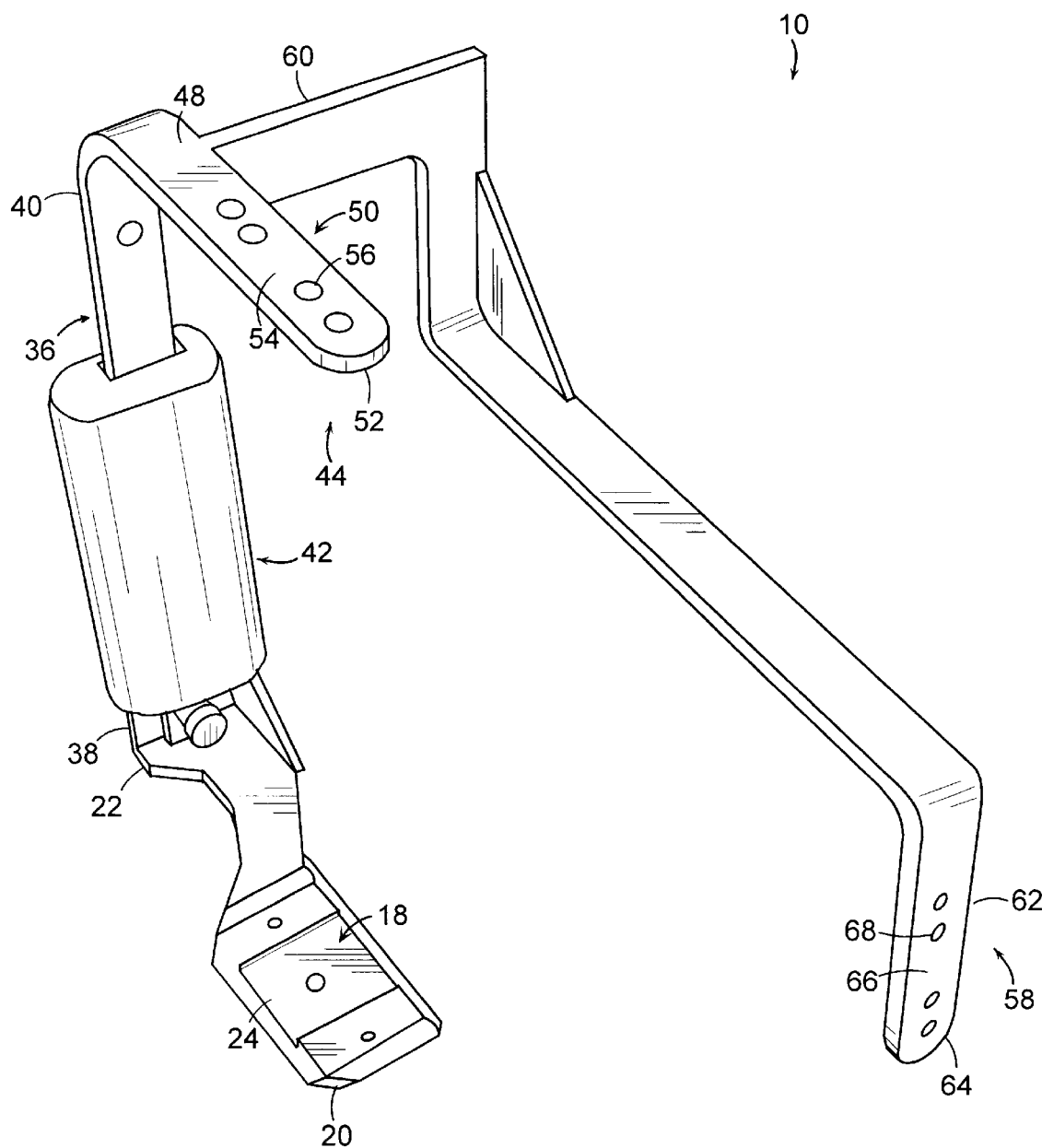
FIGS. 4–6 are perspective views of a second embodiment of the present invention.
Figure 5:
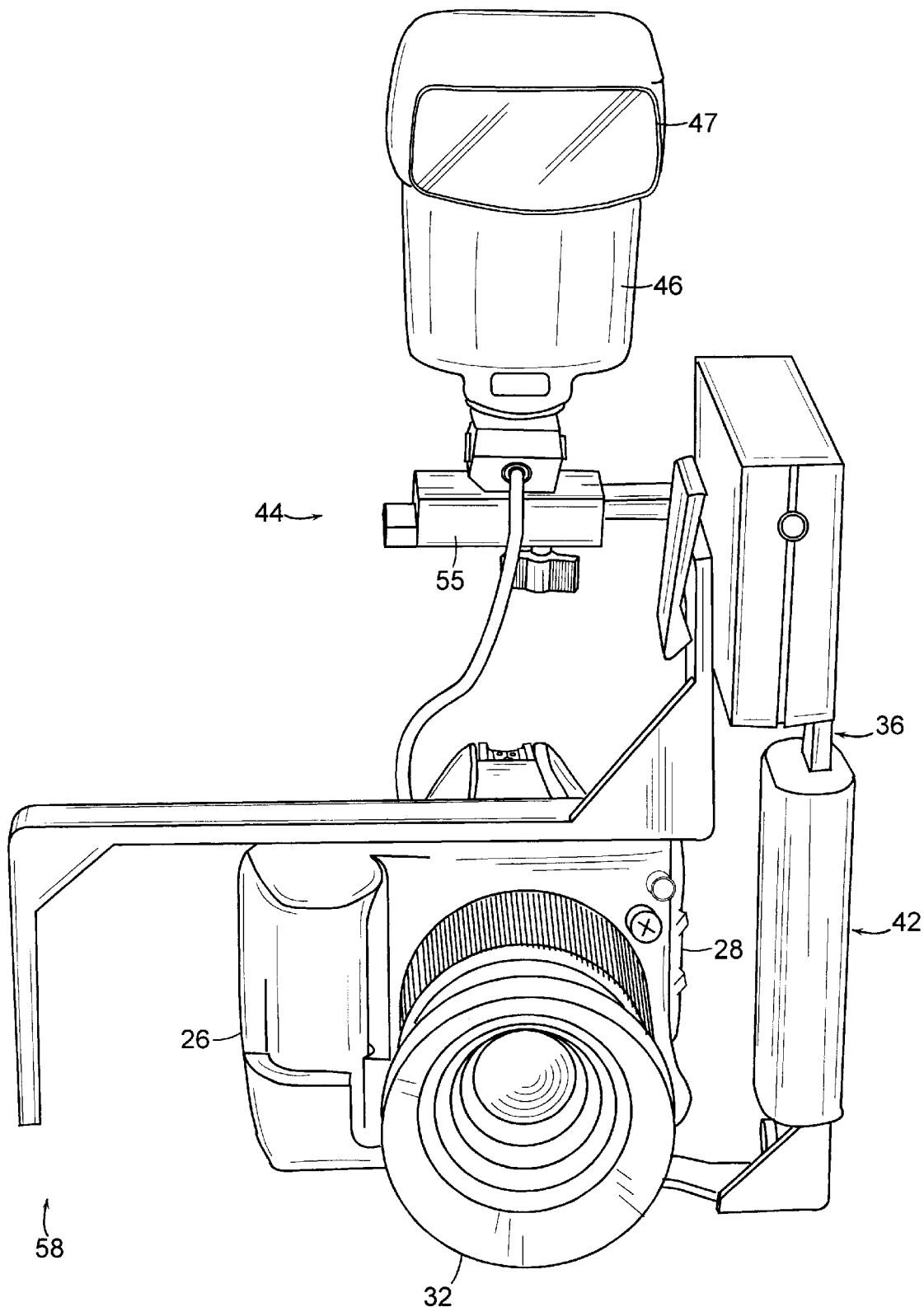
Figure 6:
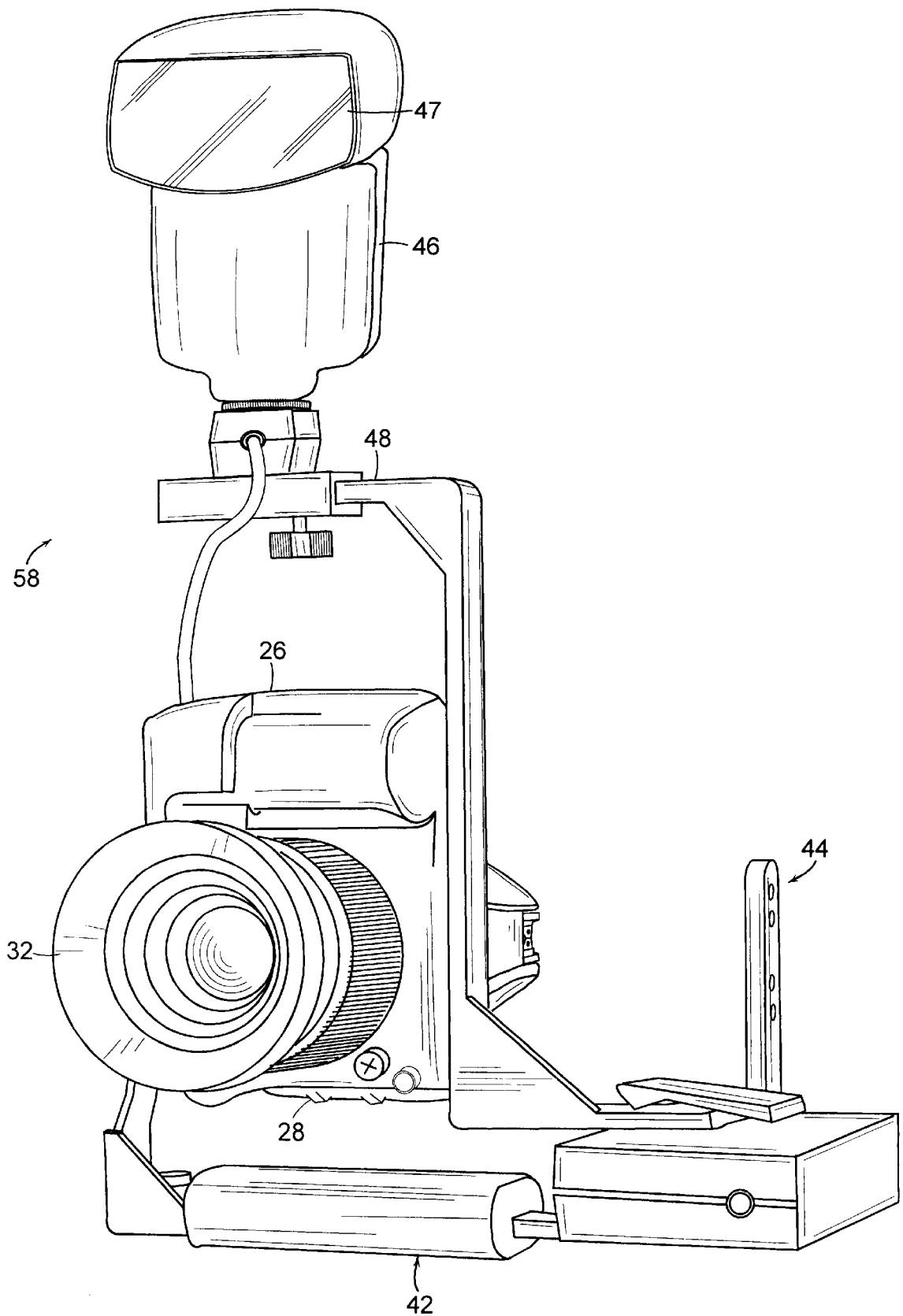

Referring to FIGS. 4–6, wherein a second embodiment of the device 10 of the present invention is shown. The second embodiment of the device 10 is substantially similar to the previous embodiment. In the second embodiment the second flash unit support member 58 extends further outward from the vertical support member 36. However, as in the case of the first embodiment, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 7:
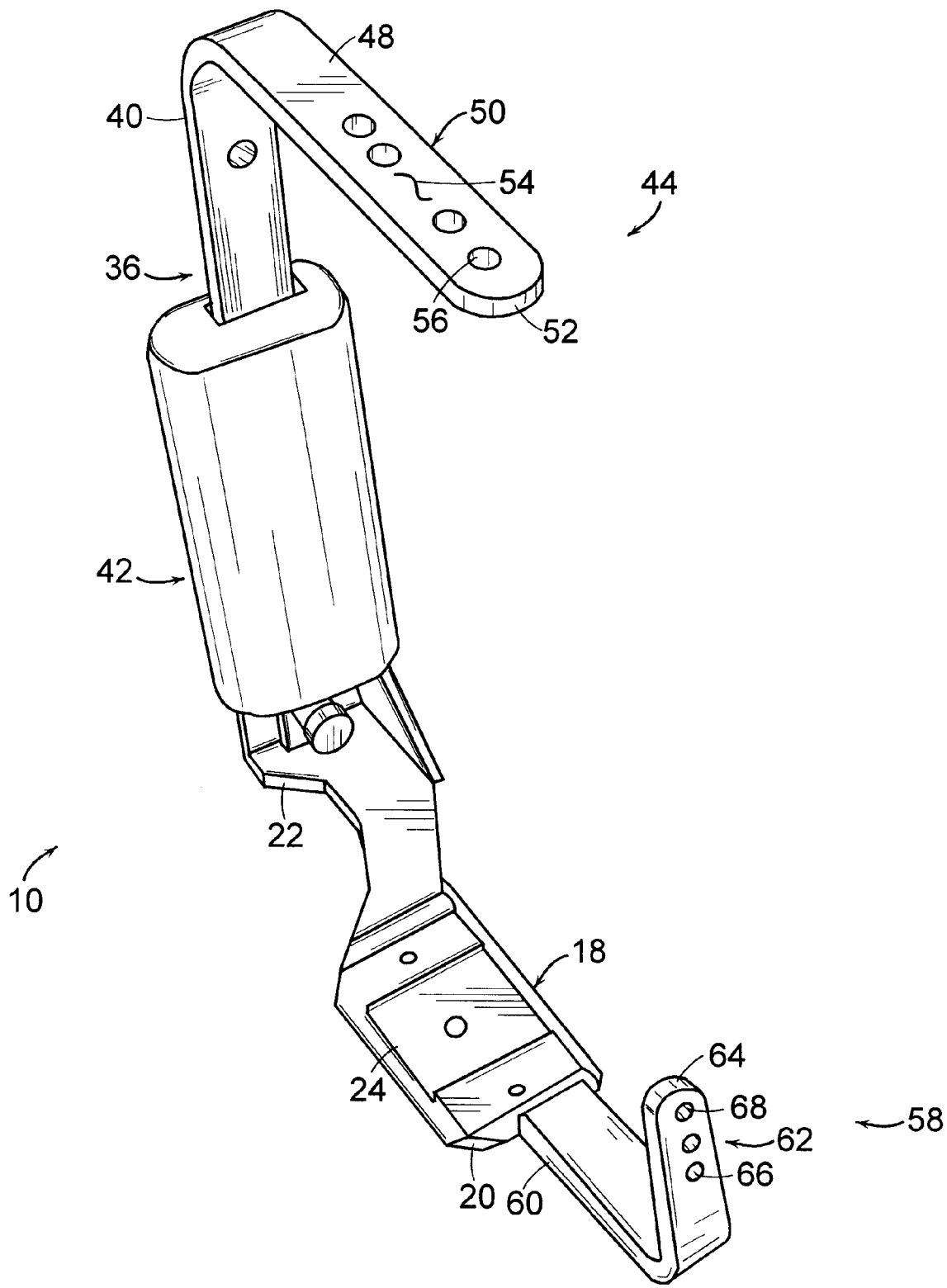
FIGS. 7 and 8 are perspective views of a third and fourth embodiment of the present invention.

Referring to FIG. 7, wherein a third embodiment of the device 10 is shown. The third embodiment of the device 10 is substantially similar to the previous embodiments. In the third embodiment, the first end portion 60 of the second flash unit support member 58 is engaged with the first end portion 20 of the base member 18 and the second free end portion 64 is facing upward. Further, the mounting portion 50 is aligned with and substantially perpendicular to the mounting portion 62. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 8:
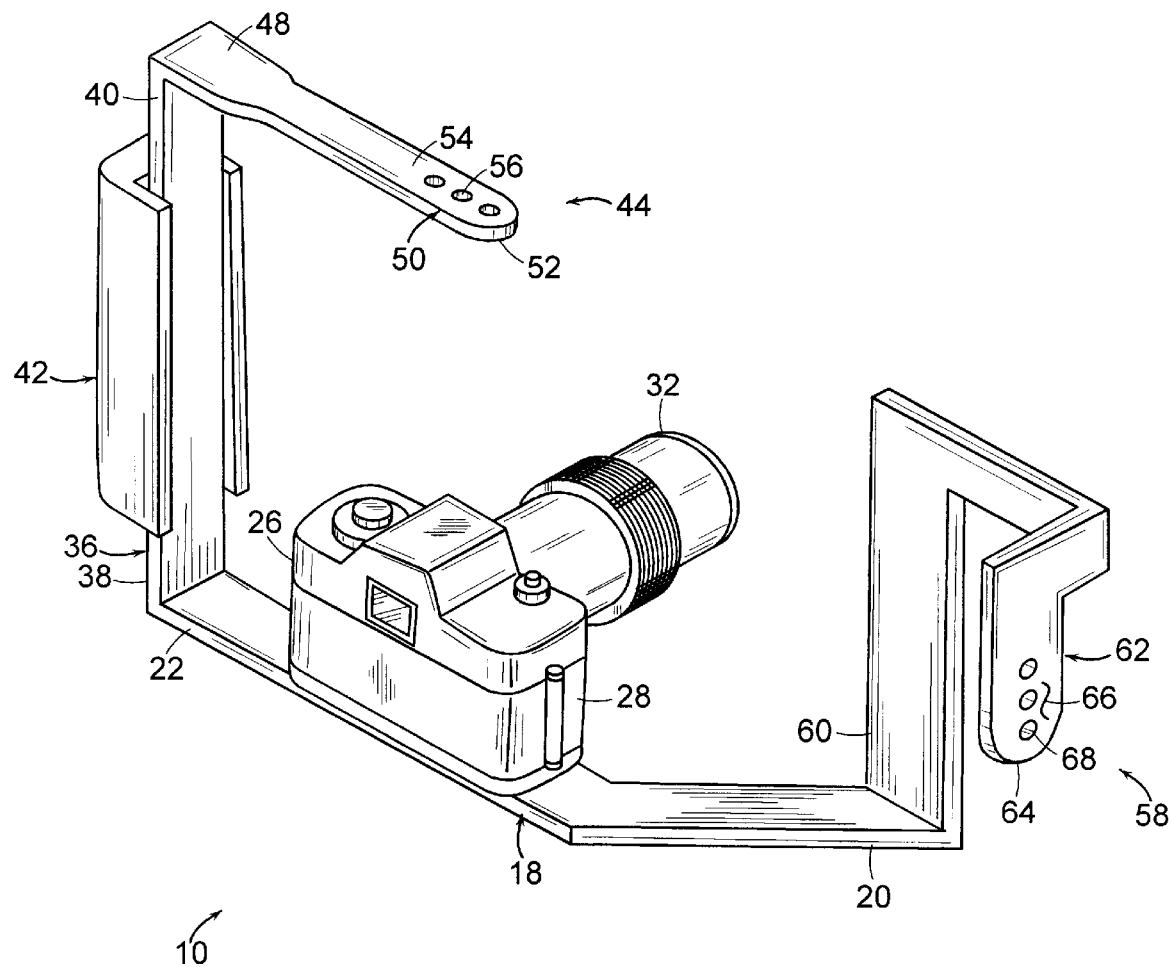

Referring to FIG. 8, wherein a fourth embodiment of the device 10 is shown. The fourth embodiment of the device 10 is substantially similar to the previous embodiments. In the fourth embodiment, the first end portion 60 of the second flash unit support member 58 is engaged with the first end portion 20 of the base member 18 and the second free end portion 64 is facing downward. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 9:
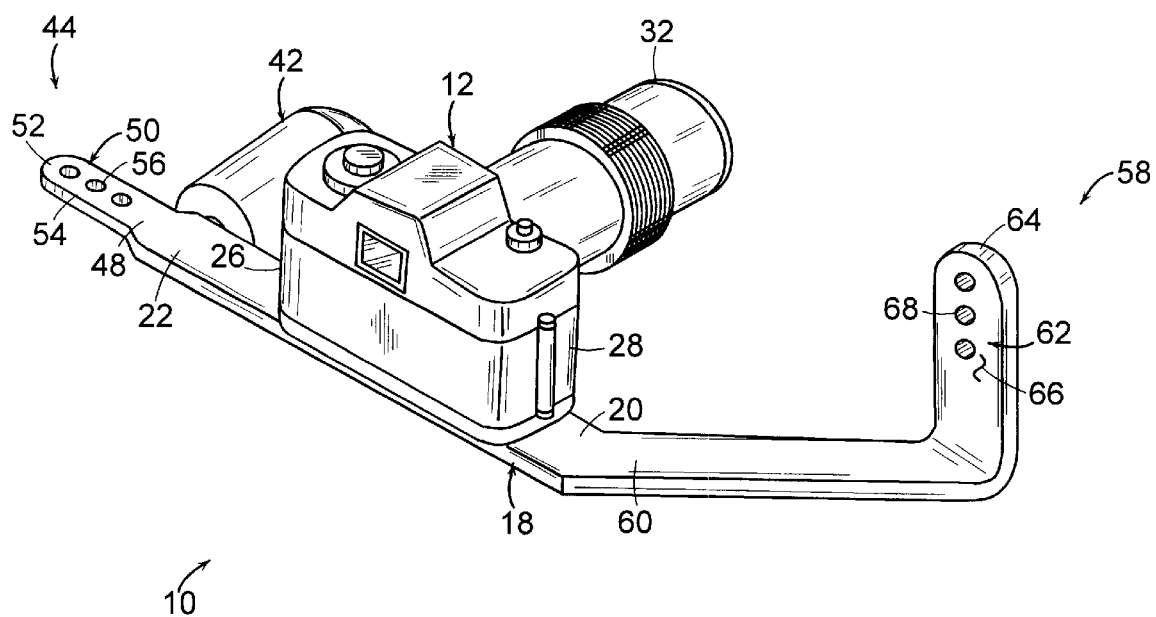
FIGS. 9 and 10 are perspective views of a fifth and sixth embodiment of the present invention.

Referring to FIG. 9, wherein a fifth embodiment of the device 10 is shown. The fifth embodiment of the device 10 is substantially similar to the previous embodiments. In the fifth embodiment, the second end portion 48 of the first flash unit support member 44 is engaged directly to the second end portion 22 of the base member 18 while the first end portion 60 of the second flash unit support member 58 is engaged with the first end portion 20 of the base member 18. The handle member 42 is shown in the shape of a knob and is engaged with the second end portion 22 of the base member 18. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 10:
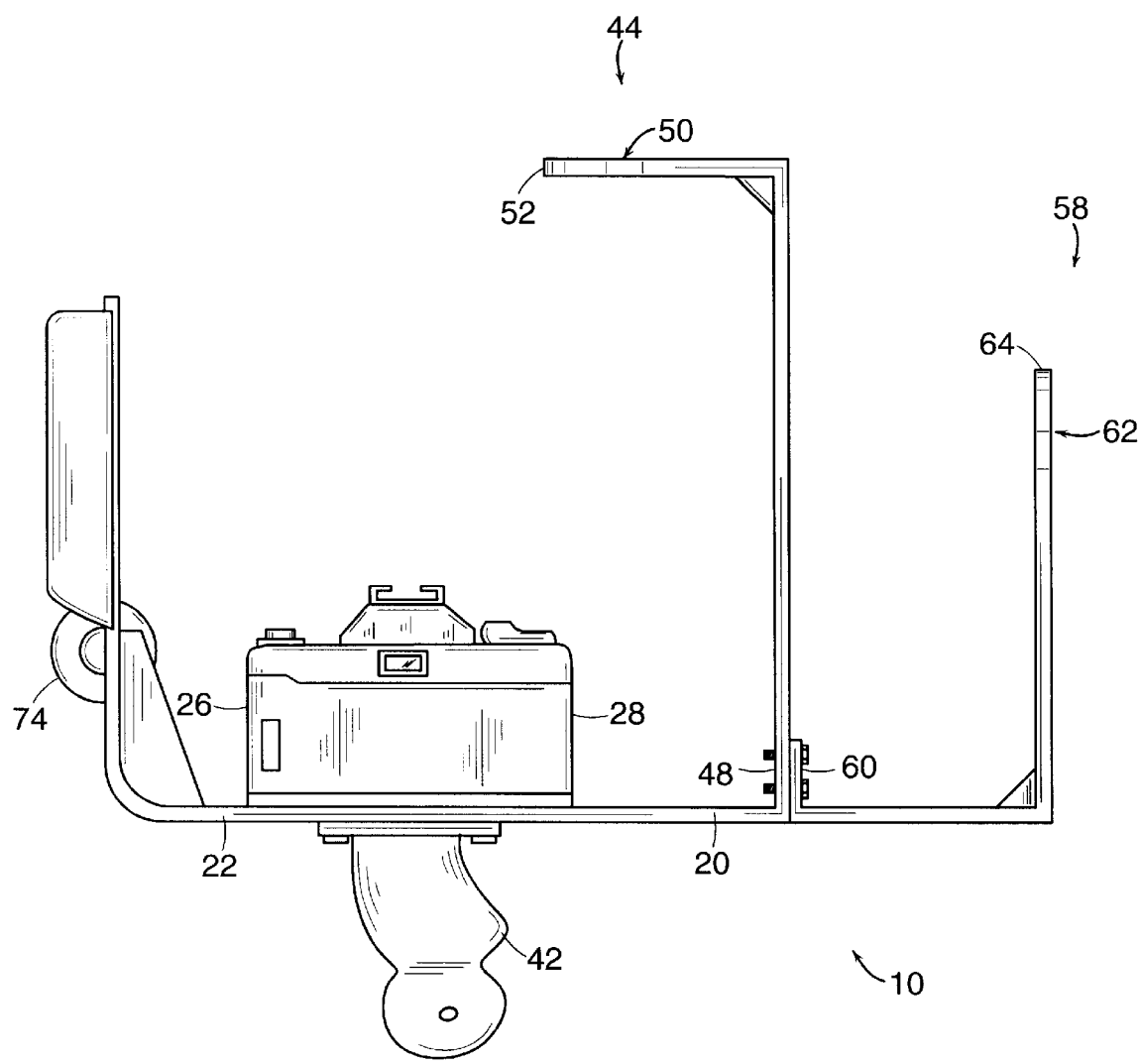

Referring to FIG. 10, wherein a sixth embodiment of the device 10 is shown. The sixth embodiment of the device 10 is substantially similar to the previous embodiments. In the sixth embodiment, the first end portion 52 of the first flash unit support member 44 and the first end portion 60 of the second flash unit support member 58 are engaged with the first end portion 48 of the base member 18. The handle member 42 is shown in the shape of a stem and is engaged with the bottom side of the base member 18. Further, a second handle member 74 in the shape of a knob is provided to assist the person in supporting and orientating the camera 12 to either the horizontal or vertical position. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 11:
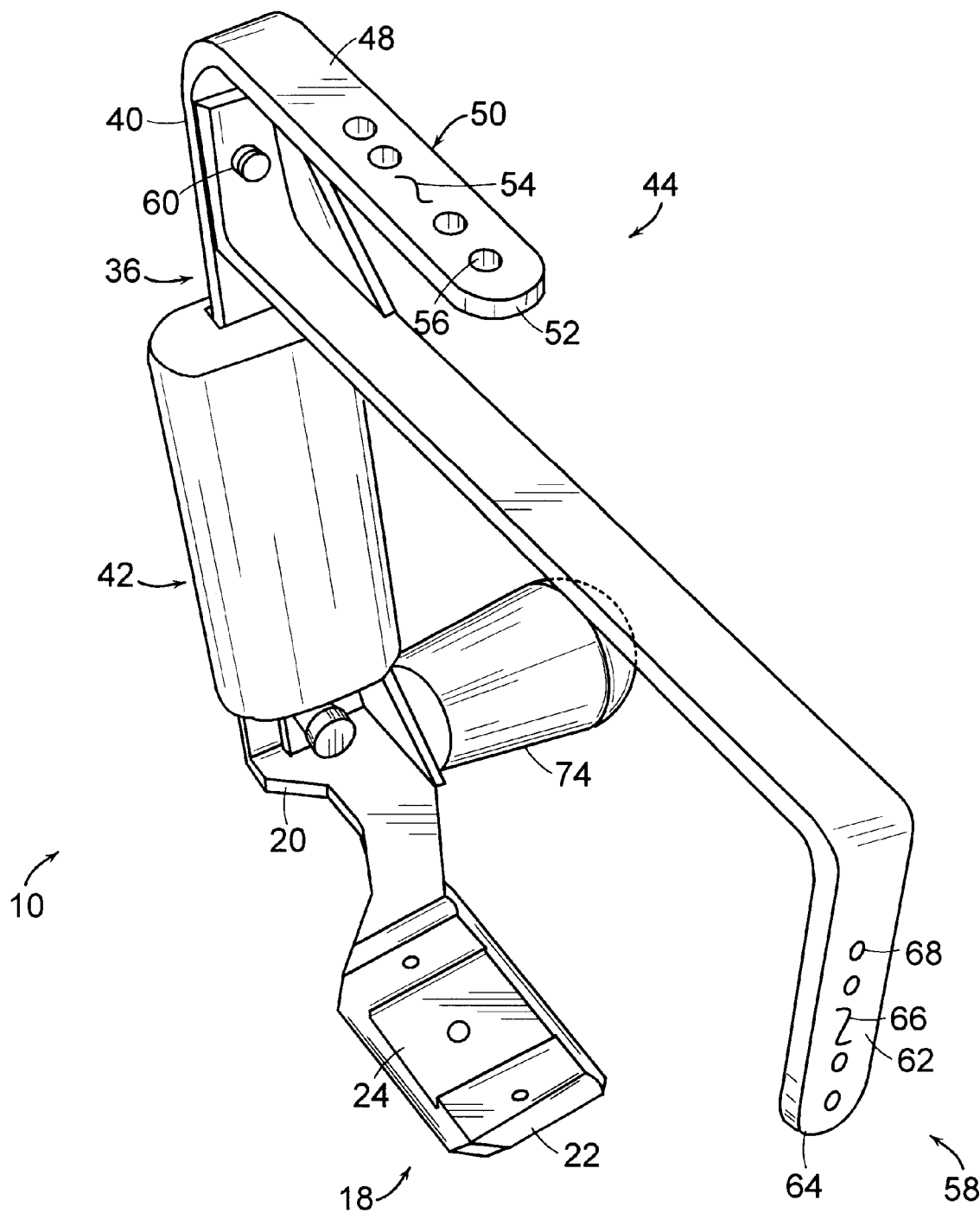
FIGS. 11 and 12 are perspective views of a seventh and eight embodiment of the present invention.

Referring to FIG. 11, wherein a seventh embodiment of the device 10 is shown. The seventh embodiment of the device 10 is substantially similar to the previous embodiments. In the seventh embodiment, the first end portion 48 of the first flash unit support member 44 and the first end portion 60 of the second flash unit support member 58 are engaged directly to the second end portion 40 of the vertical support member 36. The mounting portion 50 and the mounting portion 62 are in alignment and are aligned and substantially perpendicular to each other. The free end portion 64 of the second flash unit support member faces downward. Further, a second handle member 74 in the shape of a knob is provided to further assist the person in supporting and orientating the camera 12 to either the horizontal or vertical position. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 12:
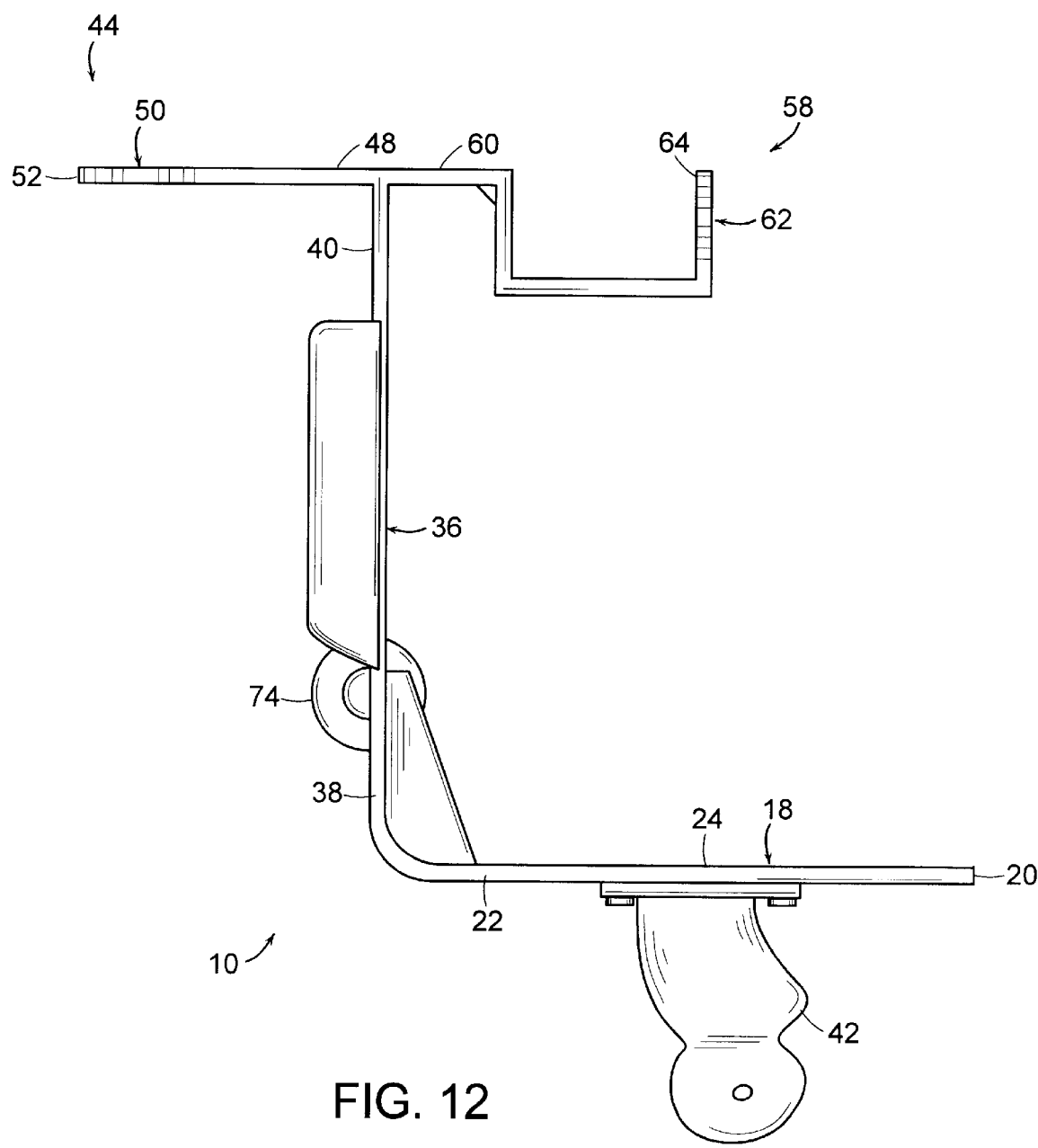

Referring to FIG. 12, wherein an eighth embodiment of the device 10 is shown. The eighth embodiment of the device 10 is substantially similar to the previous embodiments. In the eight embodiment, the first end portion 48 of the first flash unit support member 44 and the first end portion 60 of the second flash unit support member 58 are both engaged with the second end portion 40 of the vertical support member 36 but extend outward from opposite directions from the second end portion 40. The second free end 64 of the second flash unit support member 58 faces upward. The handle member 42 is shown in the shape of a stem and is engaged with the bottom side of the base member 18. Further, a second handle member 74 is provided to assist the person in supporting and orientating the camera 12 to either the horizontal or vertical position. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 13:
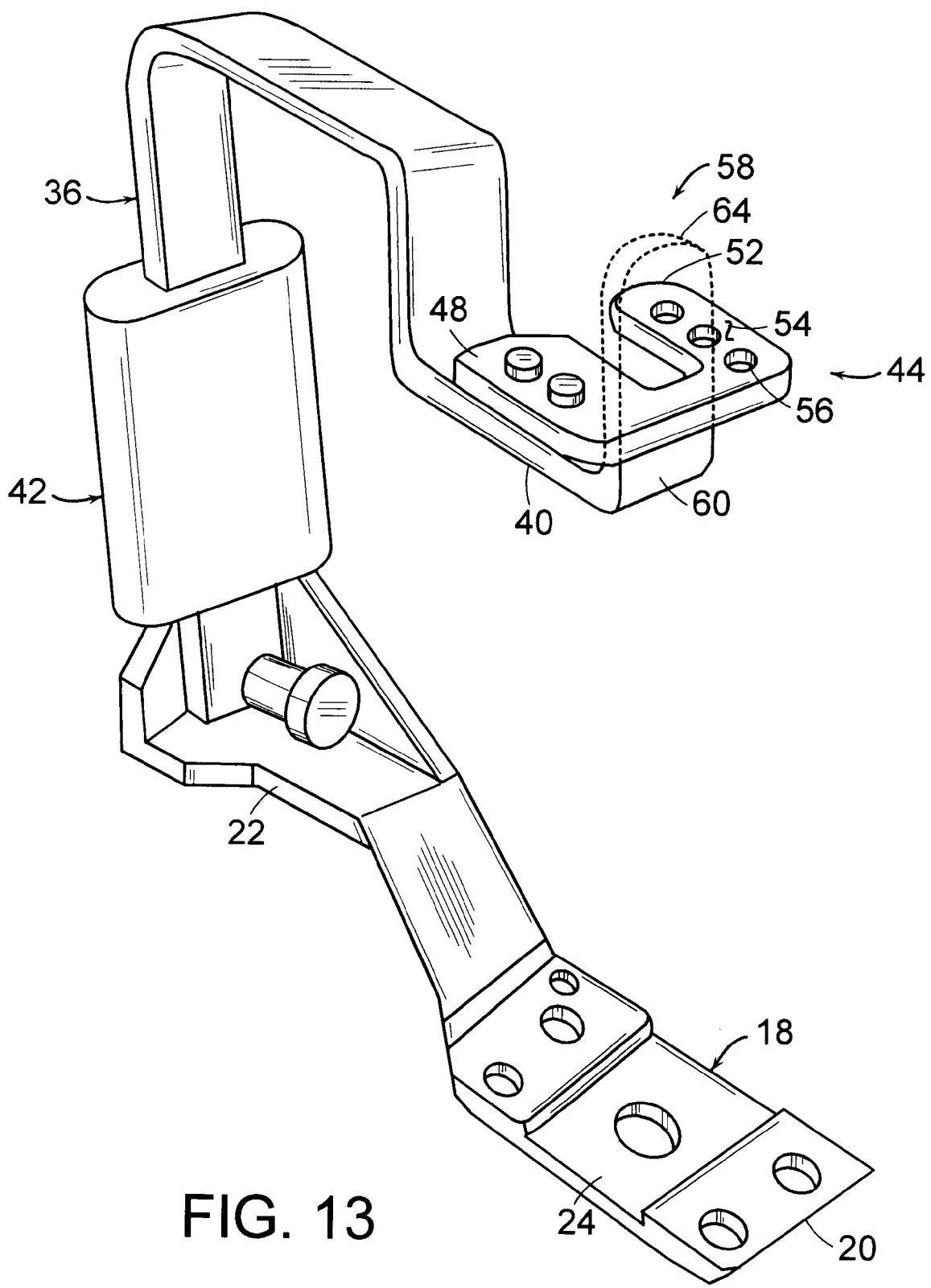
FIG. 13 is a perspective view of a ninth embodiment of the present invention.

Referring to FIG. 13 wherein a ninth embodiment of the present invention is shown. The ninth embodiment of the device 10 is substantially similar to the previous embodiments. In the ninth embodiment, the second end portion 40 of the vertical support member 36 is extended inward from the previous embodiments and the first end portion 48 of the first flash unit support member 44 and the first end portion 60 of the second flash unit support member 58 are engaged with the second end portion 40 of the vertical support member 36. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 14:
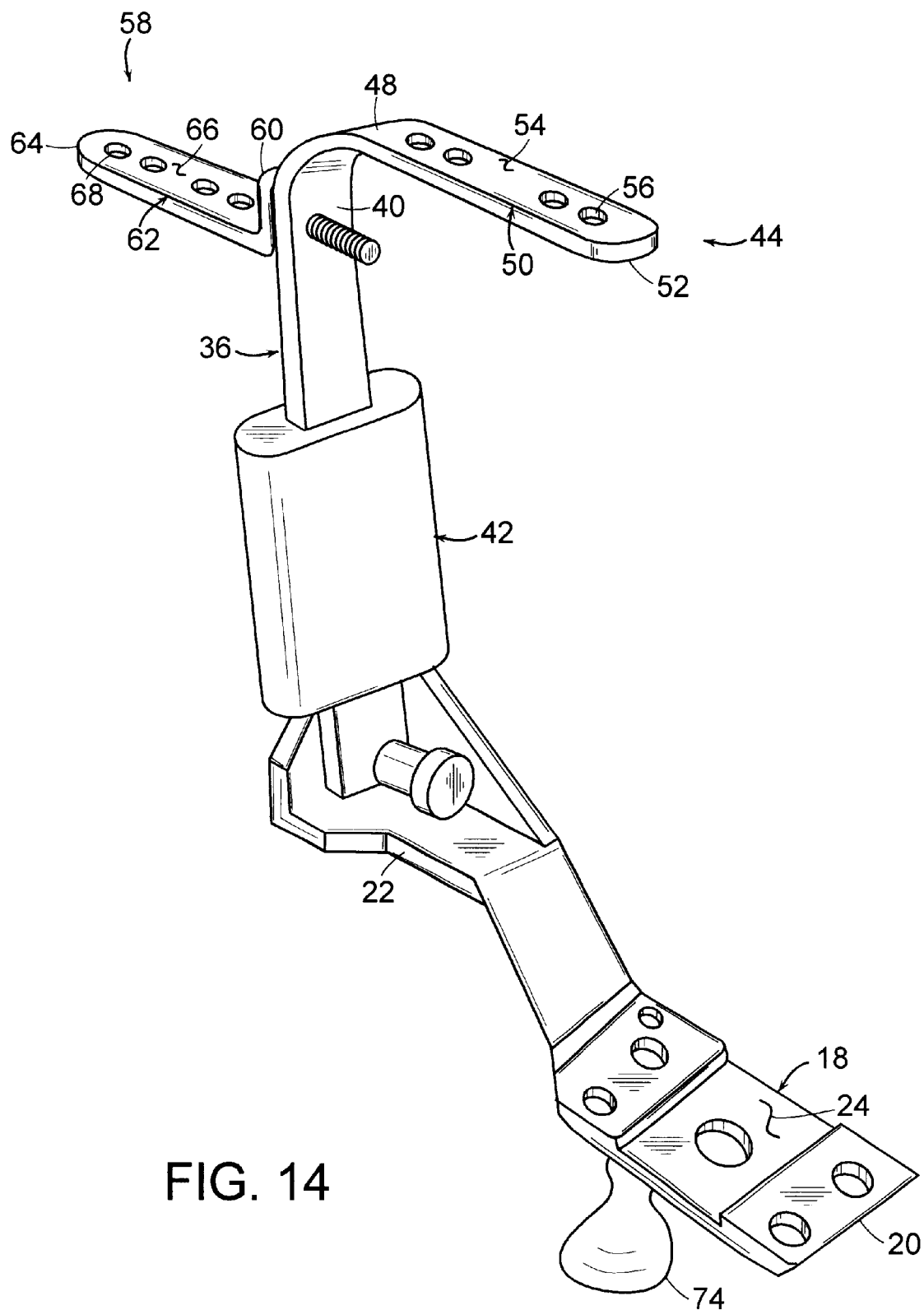
FIG. 14 is a perspective view of a tenth embodiment of the present invention.

Referring to FIG. 14 wherein a tenth embodiment of the present invention is shown. In the tenth embodiment, the first end portion 48 of the first flash unit support member 44 and first end portion 60 of the second flash unit support member 58 are both engaged with the second end portion 40 of the vertical support member 36 but extend outward in opposite directions from the second end portion 40. Further, the mounting portion 50 of the first flash unit support member 44 is substantially aligned and parallel with the mounting portion 62 of the second flash unit support member 58. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 15:
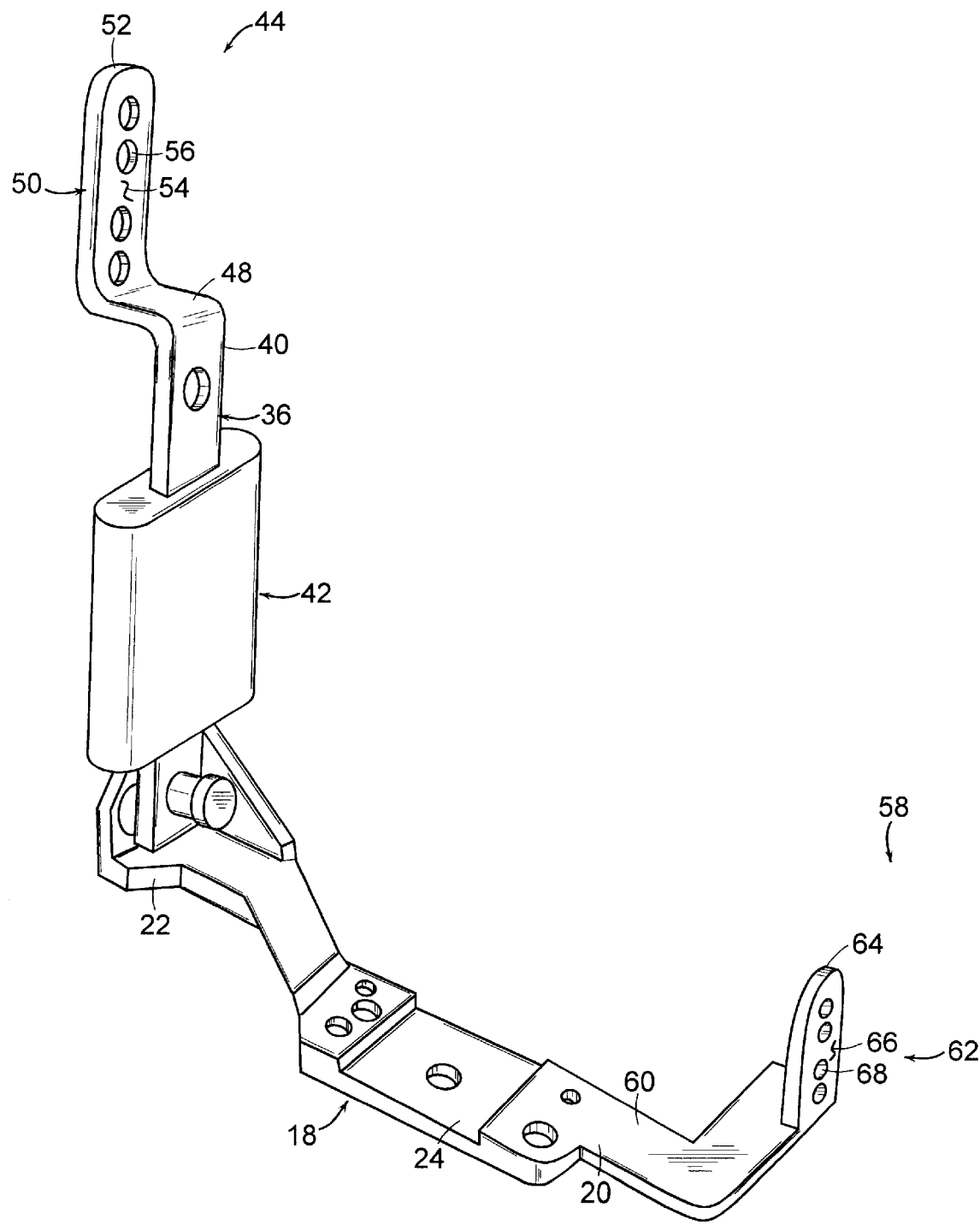
FIG. 15 is a perspective view of an eleventh embodiment of the present invention.

Referring to FIG. 15 wherein an eleventh embodiment of the present invention is shown. In the eleventh embodiment, the first flash unit support member 44 is engaged with the base member 28 through the vertical support member 36. The first end portion 60 of the second flash unit support member 58 is engaged with the first end portion 20 of the base member 18. Further, the mounting portion 50 of the first flash unit support member 44 is substantially parallel with the mounting portion 62 of the second flash unit support member 58 and the second free ends 52 and 64 face upward. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

Figure 16:
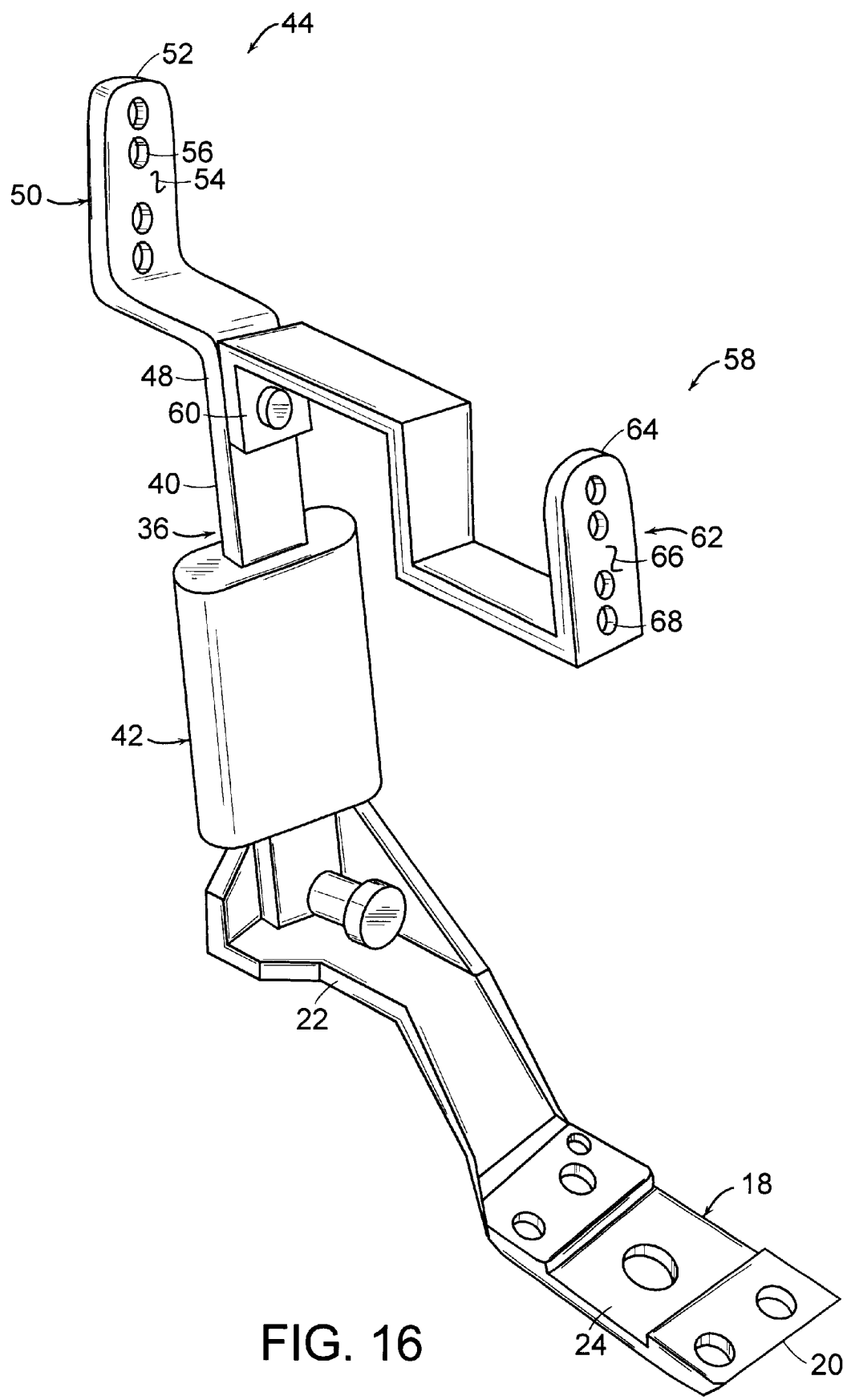
FIG. 16 is a perspective view of a twelfth embodiment of the present invention.

Referring to FIG. 16 wherein a twelfth embodiment of the present invention is shown. In the twelfth embodiment, the first end portion 48 of the first flash unit support member 44 and first end portion 60 of the second flash unit support member 58 are engaged with the base member 28 through the second end portion 40 of the vertical support member 36. Further, the mounting portion 50 of the first flash unit support member 44 is substantially parallel with the mounting portion 62 of the second flash unit support member 58 and the second free ends 52 and 64 face upward. However, as in the case of the previous embodiments, irrespective of whether the person chooses to orientate the camera 12 in either the horizontal position or the vertical position, the person can selectively position the flash unit 46 on either the mounting portion 50 of the first flash unit support member 44 or the mounting portion 62 of the second flash unit support member 58 so that the light source 47 of the flash unit 46 is disposed above the lens 32 of the camera 12. Further, irrespective of whether the person orientates the camera 12 in either the horizontal position or the vertical position, the handle member 42 is always positioned adjacent to or below the lens 32 of the camera 12 so not to interfere with the operation of the flash unit 46.

The foregoing description is intended primarily for purposes of illustration. This invention may be embodied in other forms without departing from the spirit or scope of the invention. Modifications and variations still falling within the spirit or the scope of the invention will be readily apparent to those of skill in the art.

What is claimed:

1. A device in combination with a camera to allow a person to orientate a camera in either a horizontal or vertical position while allowing the person to position the light source of a flash unit above the lens of the camera, the device comprising:

(a) a base member having a camera support portion and first and second end portions, said camera support portion being adapted to secure the camera;

(b) a first handle member engaged with said base member, said first handle member being adapted to allow the person to orientate the camera to a horizontal position or a vertical position, said first handle member being disposed adjacent to the side portion or below the lens of the camera when the camera is orientated in said horizontal position or said vertical position;

(c) a first flash unit support member comprising a first end portion, a first mounting portion and a first free end portion, said first mounting portion being adapted to removably secure the flash unit;

(d) a second flash unit support member comprising a second end portion, a second mounting portion and a second free end portion adapted to removably secure the flash unit; and (e) irrespective of whether the person chooses to orientate the camera in said horizontal position or said vertical position, the person can selectively position the flash unit on said first mounting portion or said second mounting portion so that the light source of the flash unit is disposed above the lens of the camera; and (f) said first end portion of said first flash unit support member is engaged with said second end portion of said base member and said first end portion of said second flash unit support member is engaged with said first end portion of said base member.

2. The device of claim 1, wherein said first mounting portion comprises a first mounting surface terminating at said first free end portion and said second mounting portion comprises a second mounting surface terminating at said second free end portion.

3. The device of claim 2, wherein said first mounting surface and said second mounting surface are substantially planar.

4. The device of claim 2, wherein said first mounting surface is substantially perpendicular to said second mounting surface.

5. The device of claim 2, wherein said first mounting surface is substantially parallel to said base member and said second mounting surface is substantially perpendicular to said base member.

6. The device of claim 1 further comprising a second handle member engaged with said base member, said second handle member being adapted to allow the person to orientate said base member and camera from a horizontal position to a vertical position.

7. The device of claim 1 further comprising a vertical support member having a first end portion and a second end portion, said first end portion of said vertical member being engaged with said second end portion of said base member, said first end portions of said first and second flash unit support members being engaged with said second end portion of said vertical member.

8. The device of claim 1, further comprising a vertical support member having a first end portion and a second end portion, said first end portion of said vertical member being engaged with said second end portion of said base member, said first end portion of said first flash unit support member being engaged with said second end portion of said vertical member and said first end portion of said second flash unit support member being engaged with said first end portion of said base member.

9. A device in combination with a camera to allow a person to orientate a camera in either a horizontal or vertical position while allowing the person to position the light source of a flash unit above the lens of the camera, the device comprising:

(a) a base member having a camera support portion and first and second end portions, said camera support portion being adapted to secure the camera;

(b) a first handle member engaged with said base member, said first handle member being adapted to allow the person to orientate the camera to a horizontal position or a vertical position, said first handle member being disposed adjacent to the side portion or below the lens of the camera when the camera is orientated in said horizontal position or said vertical position;

(c) a first flash unit support member comprising a first end portion, a first mounting portion and a first free end portion, said first mounting portion being adapted to removably secure the flash unit;

(d) a second flash unit support member comprising a second end portion, a second mounting portion and a second free end portion adapted to removably secure the flash unit; and (e) irrespective of whether the person chooses to orientate the camera in said horizontal position or said vertical position, the person can selectively position the flash unit on said first mounting portion or said second mounting portion so that the light source of the flash unit is disposed above the lens of the camera; and (f) said first end portion of said first flash unit support member and said second end portion of said second flash unit support member are engaged with said first end portion of said base member.

10. The device of claim 9, wherein said first free end portion is spaced apart from said second free end portion to allow the flash unit to be engaged with said first mounting portion or said second mounting portion.

11. The device of claim 9 wherein said first mounting portion comprises a first mounting surface terminating at said first free end portion and said second mounting portion comprises a second mounting surface terminating at said second free end portion.

12. The device of claim 11 wherein said first mounting surface and said second mounting surface are substantially planar.

13. The device of claim 11, wherein said first mounting surface is substantially perpendicular to said second mounting surface.

14. The device of claim 11, wherein said first mounting surface is substantially parallel to said base member and said second mounting surface is substantially perpendicular to said base member.

15. The device of claim 9 further comprising a second handle member engaged with said base member, said second handle member being adapted to allow the person to orientate said base member and camera from a horizontal position to a vertical position.

16. The device of claim 9 further comprising a vertical support member having a first end portion and a second end portion, said first end portion of said vertical member being engaged with said second end portion of said base member, said first end portions of said first and second flash unit support members being engaged with said second end portion of said vertical member.

17. The device of claim 9, further comprising a vertical support member having a first end portion and a second end portion, said first end portion of said vertical member being engaged with said second end portion of said base member, said first end portion of said first flash unit support member being engaged with said second end portion of said vertical member and said first end portion of said second flash unit support member being engaged with said first end portion of said base member.

* * * * *